United States Patent
Pan et al.

(10) Patent No.: US 9,554,288 B2
(45) Date of Patent: Jan. 24, 2017

(54) METHOD, SYSTEM, AND DEVICE FOR CONFIRMING UPLINK-DOWNLINK CONFIGURATION

(75) Inventors: Xueming Pan, Beijing (CN); Shaohui Sun, Beijing (CN); Guojun Xiao, Beijing (CN); Fei Qin, Beijing (CN); Zukang Shen, Beijing (CN); Yu Ding, Beijing (CN)

(73) Assignee: Datang Mobile Communications Equipment Co., Ltd, Beijing (CN)

( * ) Notice: Subject to any disclaimer, the term of this patent is extended or adjusted under 35 U.S.C. 154(b) by 209 days.

(21) Appl. No.: 13/991,154

(22) PCT Filed: Dec. 2, 2011

(86) PCT No.: PCT/CN2011/083356
§ 371 (c)(1),
(2), (4) Date: Sep. 16, 2013

(87) PCT Pub. No.: WO2012/072038
PCT Pub. Date: Jun. 7, 2012

(65) Prior Publication Data
US 2014/0003288 A1    Jan. 2, 2014

(30) Foreign Application Priority Data
Dec. 2, 2010    (CN) .......................... 2010 1 0570409

(51) Int. Cl.
*H04W 24/02*    (2009.01)
*H04W 24/10*    (2009.01)
*H04W 72/04*    (2009.01)

(52) U.S. Cl.
CPC ............. *H04W 24/02* (2013.01); *H04W 24/10* (2013.01); *H04W 72/0446* (2013.01)

(58) Field of Classification Search
CPC .... H04W 24/02; H04W 24/10; H04W 72/046; H04W 72/12; H04W 7/082
See application file for complete search history.

(56) References Cited

U.S. PATENT DOCUMENTS

2004/0131029 A1*   7/2004   Tobe et al. .................... 370/331
2006/0189334 A1*   8/2006   Wakabayashi ................ 455/500
(Continued)

FOREIGN PATENT DOCUMENTS

CN          1816198 A         8/2006
CN        101562835 A        10/2009
(Continued)

OTHER PUBLICATIONS

PCT International Search Report for PCT Counterpart Application No. PCT/CN2011/083356, 6 pgs., (Mar. 8, 2012).
(Continued)

*Primary Examiner* — Ian N Moore
*Assistant Examiner* — Phong La
(74) *Attorney, Agent, or Firm* — Blakely, Sokoloff, Taylor & Zafman LLP

(57) ABSTRACT

Embodiments of the present invention relate to the technical field of wireless communication, and relate particularly to a method, a system, and a device for confirming an uplink-downlink configuration, for use in confirming via interference detection whether or not a cell is capable of conducting independently the uplink-downlink configuration. The method of the embodiments of the present invention comprises: a network side device confirming the receipt of a first RSRP value of a reference signal from a second cell by a first cell, the second cell being an adjacent cell of the first cell (201); on the basis of the first RSRP value, the network side device confirming whether or not the first cell is capable of conducting autonomously the uplink-downlink configura-
(Continued)

tion (202). Measuring the RSRP value to determine whether or not the cell is capable of conducting independently the uplink-downlink configuration allows for the normal operation of a dynamic uplink-downlink configuration, reduced interference between adjacent cells in a dynamic uplink-downlink configuration environment, and improved system efficiency.

18 Claims, 4 Drawing Sheets

(56) References Cited

U.S. PATENT DOCUMENTS

| | | | | |
|---|---|---|---|---|
| 2008/0057996 | A1* | 3/2008 | Sung | H04W 52/146 455/522 |
| 2009/0016261 | A1* | 1/2009 | Laroia et al. | 370/328 |
| 2009/0017838 | A1* | 1/2009 | Laroia | H04W 48/18 455/456.1 |
| 2009/0028112 | A1* | 1/2009 | Attar et al. | 370/332 |
| 2009/0312008 | A1 | 12/2009 | Lindoff et al. | |
| 2010/0054237 | A1* | 3/2010 | Han et al. | 370/350 |
| 2010/0093385 | A1* | 4/2010 | Kazmi et al. | 455/517 |
| 2010/0103828 | A1* | 4/2010 | Kuroda et al. | 370/252 |
| 2010/0120370 | A1* | 5/2010 | Ishii | H04B 7/022 455/67.11 |
| 2010/0208603 | A1* | 8/2010 | Ishii | H04B 1/7113 370/252 |
| 2010/0208604 | A1* | 8/2010 | Kazmi et al. | 370/252 |
| 2010/0272004 | A1* | 10/2010 | Maeda et al. | 370/312 |
| 2010/0272018 | A1* | 10/2010 | Furueda et al. | 370/328 |
| 2010/0284303 | A1* | 11/2010 | Catovic | H04W 24/02 370/254 |
| 2012/0282968 | A1* | 11/2012 | Toskala | H04W 24/10 455/517 |

FOREIGN PATENT DOCUMENTS

| | | |
|---|---|---|
| CN | 101697628 A | 4/2010 |
| CN | 101754377 A | 6/2010 |
| CN | 101808381 A | 8/2010 |
| CN | 102036295 A | 4/2011 |
| WO | WO 2010/101939 A2 | 9/2010 |

OTHER PUBLICATIONS

3GPP TS 36.211 V9.1.0, "$3^{rd}$ Generation Partnership Project . . . ", (Release 9), Mar. 2010, 85 pages.
PCT Written Opinion of the International Searching Authority for PCT Counterpart Application No. PCT/CN2011/083356, 14 pgs. (including English translation), (Mar. 8, 2012).
PCT Notification Concerning Transmittal of International Preliminary Report on Patentability (Chapter I of the Patent Cooperation Treaty) for PCT Counterpart Application No. PCT/CN2011/083356, 17 pgs. (including English translation), (Jun. 13, 2013).
PCT International Preliminary Report on Patentability for PCT Counterpart Application No. PCT/CN2011/083356, 7 pgs. (Jun. 4, 2013).

* cited by examiner

METHOD, SYSTEM, AND DEVICE FOR CONFIRMING UPLINK-DOWNLINK CONFIGURATION

CROSS-REFERENCE TO RELATED APPLICATIONS

This patent application is a U.S. National Stage under 35 U.S.C. §371 of International Application No. PCT/CN2011/083356, filed on Dec. 2, 2011, entitled METHOD, SYSTEM, AND DEVICE FOR CONFIRMING UPLINK-DOWNLINK CONFIGURATION, designating the United States, and claiming the benefit of Chinese Patent Application No.: 201010570409.9, filed with the Chinese Patent Office on Dec. 2, 2010 and entitled "Method, System and Apparatus for Determining Uplink and Downlink Configuration", which is hereby incorporated by reference in its entirety.

FIELD

The present invention relates to the field of wireless communications and particularly to a method, system and apparatus for determining an uplink and downlink configuration.

BACKGROUND

With regarding to general duplex modes adopted in a cellular system, a Time Division Duplex (TDD) mode refers to transmission of uplink and downlink signals in the uplink and downlink with the same operating frequency band in different periods of time, where there is a Guard Period (GP) between the uplink and downlink; and a Frequency Division Duplex (FDD) mode refers to possible transmission of uplink and downlink signals in the uplink and downlink with different operating frequency bands at the same time over different frequency carriers, where there is a Guard Band (GB) between the uplink and downlink.

A frame structure of a Long Term Evolution (LTE) TDD system is somewhat complicated, and as illustrated in FIG. 1A, a radio frame with a length of 10 ms includes 10 sub-frames in total including special sub-frame(s) and normal sub-frames, and each sub-frame is of 1 ms. The special sub-frame includes three time slots, a Downlink Pilot Time Slot (DwPTS) for transmitting a Primary Synchronized Signal (PSS), a Physical Downlink Control Channel (PDCCH), a Physical HARQ Indication Channel (PHICH), a Physical Control Format Indication Channel (PCFICH), a Physical Downlink Shared Channel (PDCCH), etc.; a GP for a guard period between the downlink and uplink; and an Uplink Pilot Time Slot (UpPTS) for transmitting a Sounding Reference Signal (SRS), a Physical Random Access Channel (PRACH), etc. The normal sub-frames include uplink sub-frames and downlink sub-frames for transmitting uplink/downlink control signaling, service data, etc. Particularly in one radio frame, two special sub-frames may be configured in sub-frames 1 and 6 respectively or one special sub-frame may be configured in the sub-frame 1. Sub-frame 0 and sub-frame 5, and the DwPTS in the special sub-frame(s) are always used for downlink transmission, Sub-frame 2 and the UpPTS in the special sub-frame(s) are always used for uplink transmission, and the remaining sub-frames can be configured as needed for uplink transmission or downlink transmission.

In a TDD system, the same frequency resource is used for uplink and downlink transmission, and uplink and downlink signals are transmitted in different time slots. In a common TDD system including 3G Time Division Synchronized Code Division Multiple Access (TD-SCDMA) system and a 4G TD-LTE system, uplink and downlink sub-frames are allocated statically or semi-statically, and a common practice is to determine and maintain a proportional allocation of uplink and downlink sub-frames dependent upon a cell type and a rough service proportion in the course of planning a network. This is a simple and effective practice in a context with large coverage of a macro cell. Along with the development of technologies, an increasing number of low-power base stations including home NodeBs and so on in a pico cell have been deployed for provision of small local coverage, and there are a small number of users with a significantly varying service demand in this kind of cell, thus there exists a scenario with a dynamically varying demand for an uplink and downlink service proportion in the cell.

In order to accommodate such a dynamically varying demand for a service proportion, some researchers come to consider optimization of the TDD system by introducing a more dynamic uplink and downlink configuration solution with the aim of accommodating a varying service proportion and improving the efficiency of the system. For example in a TDD network, a macro cell is configured with a relatively symmetric uplink and downlink proportion (DL:UL=3:2), and a part of femto cells are configured with a downlink-dominant proportion (DL:UL=4:1) in view of a predominating user demand for download, while another part of femto cells are configured with a uplink-dominant proportion (DL:UL=2:3) in view of a predominating user demand for upload.

If adjacent cells are configured with different uplink and downlink proportions, then there may be interference across time slots. In FIG. 1B, a macro cell transmits a downlink signal in a time slot in which a femto cell receives an uplink signal, then between the two cells:

Inter-NodeB interference may arise in that direct reception of the downlink signal of a macro NodeB by a femto NodeB will influence seriously the quality of the uplink signal of a Local UE (L-UE) received by the femto NodeB.

The foregoing interference may influence seriously the performance of the entire network, but there is no solution in the prior art to such an interference problem.

SUMMARY

Embodiments of the invention provide a method, system and apparatus for determining an uplink and downlink configuration so as to detect interference to thereby determine whether a cell can select an uplink and downlink configuration independently.

An embodiment of the invention provides a method of determining an uplink and downlink configuration, the method includes:

a network-side apparatus determining a first RSRP value of a reference signal of a second cell received by a first cell, wherein the second cell is an adjacent cell to the first cell; and the network-side apparatus determining from the first RSRP value whether the first cell can select an uplink and downlink configuration autonomously.

An embodiment of the invention provides a network-side apparatus for determining an uplink and downlink configuration, the apparatus includes:

a first power determination module configured to determine a first RSRP value of a reference signal of a second cell received by a first cell, wherein the second cell is an adjacent cell to the first cell; and a first configuration determination module configured to determine from the first RSRP value whether the first cell can select an uplink and downlink configuration autonomously.

An embodiment of the invention provides a NodeB including:

an establishment module configured to establish downlink synchronization with an adjacent cell; and a measurement module configured to measure a downlink signal of the adjacent cell and to obtain and report a first RSRP value.

An embodiment of the invention provides a system for determining an uplink and downlink configuration, the system includes a NodeB, and the system further includes:

a network-side apparatus configured to determine a first RSRP value of a reference signal of a second cell received by a first cell, wherein the second cell is an adjacent cell to the first cell, and to determine from the first RSRP value whether the first cell can select an uplink and downlink configuration autonomously.

An embodiment of the invention provides another method of determining an uplink and downlink configuration, the method includes:

a NodeB determining a first RSRP value of a reference signal of an adjacent cell received by a current cell; and the NodeB determining from the first RSRP value whether the current cell can select an uplink and downlink configuration autonomously.

An embodiment of the invention provides another NodeB for determining an uplink and downlink configuration, the NodeB includes:

a second power determination module configured to determine a first RSRP value of a reference signal of an adjacent cell received by a current cell; and a second configuration determination module configured to determine from the first RSRP value whether the current cell can select an uplink and downlink configuration autonomously.

Since it is determined from detection of an RSRP value whether a cell can select an uplink and downlink configuration independently, a dynamic uplink and downlink configuration can be enforced normally, and interference between adjacent cells can be alleviated in a dynamic uplink and downlink configuration context to thereby improve the efficiency of a system.

DETAILED DESCRIPTION OF THE EMBODIMENTS

In embodiments of the invention, a network-side apparatus determines from a first Reference Signal Received Power (RSRP) value of a reference signal of an adjacent second cell received by a first cell whether the first cell can select an uplink and downlink configuration autonomously; or a NodeB determines from a first RSRP value of a reference signal of an adjacent cell received by a current cell whether the current cell can select an uplink and downlink configuration autonomously. Since it is determined from detection of a RSRP value whether a cell can select an uplink and downlink configuration independently, a dynamic uplink and downlink configuration can be enforced normally, and interference between adjacent cells can be alleviated in a dynamic uplink and downlink configuration context to thereby improve the efficiency of a system.

Particularly the embodiments of the invention can be applicable to a TDD system (e.g., a TD-LTE system) and also to a system in which it is necessary to adjust an uplink and downlink configuration of sub-frames dynamically, e.g., a TD-SCDMA system and latter evolved systems thereof, a Worldwide Interoperability for Microwave Access (WiMAX) system and latter evolved system thereof, etc.

The following description will be given firstly of an implementation with cooperation of the network side and the UE side and lastly of implementations respectively at the network side and the UE side, but this will not mean required cooperation of the network side and the UE side for an implementation, and in fact, problems present at the network side and the UE side can also be addressed in the separate implementations at the network side and the UE side although a better technical effect can be achieved with their cooperation in use.

The embodiments of the invention will be further detailed below with reference to the drawings.

Figure 2:
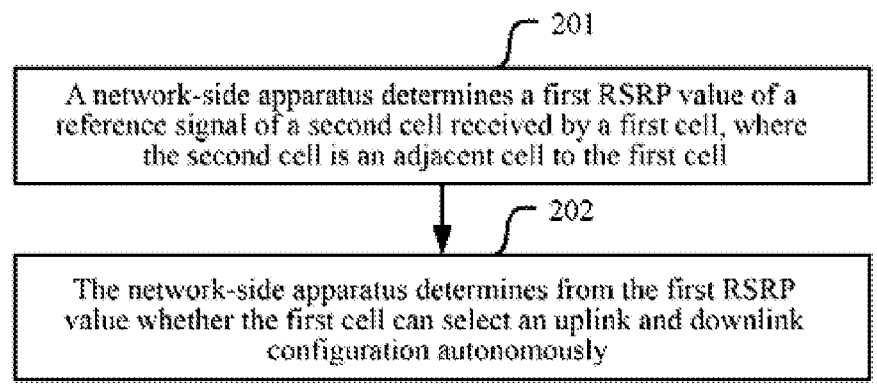
FIG. 2 is a schematic flow chart of a method of centralized determination of an uplink and downlink configuration according to an embodiment of the invention.

As illustrated in FIG. 2, a method of centralized determination of an uplink and downlink configuration according to an embodiment of the invention includes the following steps:

Step 201. A network-side apparatus determines a first RSRP value of a reference signal of a second cell received by a first cell, where the second cell is an adjacent cell to the first cell.

Step 202. The network-side apparatus determines from the first RSRP value whether the first cell can select an uplink and downlink configuration autonomously.

In the embodiment of the invention, centralized refers to a centralized management node (i.e., the network-side apparatus according to the embodiment of the invention) being arranged in a specific area to determine an interference level between adjacent cells. This centralized management node knows geographical locations of respective cells served by the node and adjacency relationships between the cells as well as types, transmission power and other information of respective NodeBs. The NodeBs send respective measured RSRP values of the respective adjacent cells (that is, the RSRP values of received reference signals of the respective adjacent cells) or the RSRP values and path loss values of the respective adjacent cells to the centralized management node via network interfaces, and the node has an interference strength threshold pre-stored therein and compares a measurement result between adjacent cells with the interference threshold to determine whether unacceptable cross interface will arise between the two adjacent cells if they are configured with different uplink and downlink configurations.

Particularly the network-side apparatus may compare the first RSRP value with a power threshold corresponding to the first cell and determine whether the first RSRP value is below the corresponding power threshold, and if so, then the apparatus determines that the first cell can select an uplink and downlink configuration autonomously; otherwise, the apparatus determines that the first cell can not select an uplink and downlink configuration autonomously.

Figure 1A:
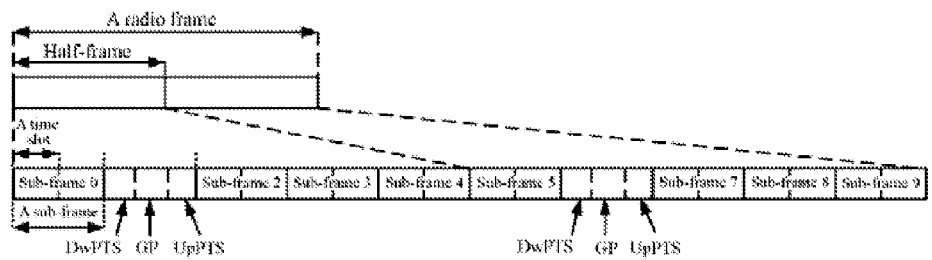
FIG. 1A is a schematic diagram of a frame structure of a TD-LTE system.
Figure 1B:
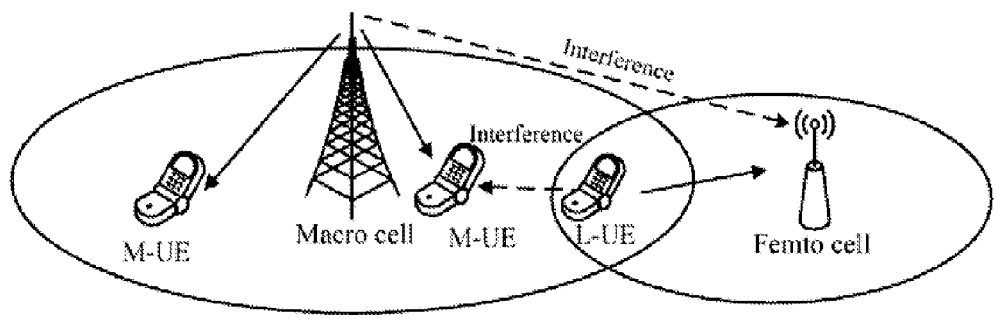
FIG. 1B is a schematic diagram of interference across time slots.

As illustrated in FIG. 1B, for example, the network-side apparatus knows that there is an adjacency relationship between the macro cell and a femto cell and the macro cell reports the detected RSRP strength of a received reference signal of the femto cell as X dBm. The network-side apparatus presets an allowable interference level value of the macro cell as M dBm (this threshold is derived from simulation and evaluation or network measurement), and if X<M, then the apparatus determines that the macro cell can select an uplink and downlink configuration autonomously.

The power threshold corresponding to the cell can be prescribed in a protocol. The power threshold can also be updated as needed.

In the step 201, the first RSRP value determined by the network-side apparatus is measured and reported by a NodeB serving the first cell.

In an implementation, the NodeB establishes downlink synchronization with the adjacent cell, measures a downlink signal of the adjacent cell and obtains the first RSRP value.

Specifically the NodeB firstly searches for a cell in an operating frequency band of a current network upon power-on to identify a physical layer cell identifier (ID) or IDs of one or more than one adjacent cell and establishes downlink synchronization with the identified adjacent cell or cells, and then measures a downlink signal or signals of the identified adjacent cell or cells, determines a first RSRP value or values of a reference signal or signals of the adjacent cell or cells received by the current cell and reports the determined first RSRP value or values to the network-side apparatus. If there are a plurality of adjacent cells, then there will be a first RSRP value for each adjacent cell. The identifiers of the cells can be bound with the corresponding first RSRP values for report; or the first RSRP values can be reported in a preset order; or the first RSRP values can be reported in another prescribed manner as long as the network-side apparatus can ascertain a specific adjacent cell to which each RSRP value corresponds.

Preferably before the step 202, the method further includes:

The network-side apparatus determines a second RSRP value of a reference signal of the first cell received by the second cell; and correspondingly in the step 202, the apparatus determines from the first RSRP value and the second RSRP value whether the first cell can select an uplink and downlink configuration autonomously.

Specifically the network-side apparatus compares the first RSRP value with the power threshold corresponding to the first cell and the second RSRP value with a power threshold corresponding to the second cell and determines whether both the RSRP values of the two cells are below the corresponding power thresholds, and if so, then the apparatus determines that the first cell can select an uplink and downlink configuration autonomously; otherwise, the apparatus determines that the first cell can not select an uplink and downlink configuration autonomously. If so, then the apparatus can further determine that the second cell can select an uplink and downlink configuration autonomously; otherwise, the apparatus can further determine that the second cell can not select an uplink and downlink configuration autonomously.

As illustrated in FIG. 1B, for example, the respective NodeBs report detected RSRP information of the adjacent NodeBs, and the network-side apparatus knows that there is an adjacency relationship between the macro cell and a femto cell and that transmission power of the macro cell is 46 dBm and transmission power of the femto cell is 20 dBm, and the macro cell reports a detected RSRP strength of the femto cell as X dBm and the femto cell reports a detected RSRP strength of the macro cell as Y dBm. The network-side apparatus presets an allowable interference level value of the macro cell as M dBm and an allowable interference level value of the femto cell as N dBm. The network-side apparatus makes centralized determination that different uplink and downlink configurations can be configured between the two cells when X<M and Y<N upon reception of the measurement information.

Here the power thresholds corresponding to the cells can be prescribed in a protocol. The power thresholds can also be updated as needed.

Particularly the network-side apparatus determines the second RSRP value in two approaches:

In a first approach, the NodeB serving the second cell reports the second RSRP value; and correspondingly the network-side apparatus receives the second RSRP value measured and reported by the NodeB serving the second cell.

The NodeB serving the second cell determines the second RSRP value in the same way as the NodeB serving the first cell determines the first RSRP value, and a repeated description thereof will be omitted here.

In a second approach, the network-side apparatus receives a path loss value between the first cell and the second cell reported by a NodeB and determines the second RSRP value from a transmission power value of the first cell and the path loss value between the first cell and the second cell.

Specifically the NodeB serving the first cell reports the path loss value between the first cell and the second cell; and the network-side apparatus makes the difference between the transmission power value of the first cell and the path loss value between the first cell and the second cell and obtains the difference as the second RSRP value upon reception of the path loss value.

In an implementation, the NodeB obtains uplink and downlink sub-frame allocation information of the adjacent cell and Cell-specific Reference Signal (CRS) transmission power information of the adjacent cell via a network interface (for example, the macro cell or a pico cell can obtain the foregoing information via an X2 interface; and a femto cell can obtain the foregoing information via an S1 interface), and then the NodeB subtracts the first RSRP from the CRS transmission power information of the corresponding adjacent cell to obtain the path loss value between the current cell and the adjacent cell.

Whether the first approach or the second approach is particularly adopted can be set in a protocol or higher-layer signaled.

After the step 202, the method further includes:

The network-side apparatus instructs the first cell to select an uplink and downlink configuration autonomously, and can further notify each cell adjacent to the first cell, after determining that the first cell can select an uplink and downlink configuration autonomously; and The network-side apparatus notifies the first cell of uniform uplink and downlink configuration information, and can further notify each cell adjacent to the first cell, after determining that the first cell can not select an uplink and downlink configuration autonomously.

The NodeB sets an uplink and downlink configuration as instructed by the network-side apparatus and sets up the current cell to start provision of a communication service to a UE.

Particularly the network-side apparatus according to the embodiment of the invention can be a higher-layer apparatus, e.g., a Radio Link Control (RNC) apparatus; or can be another network-side apparatus or a virtual apparatus or a logic node; or a new network-side apparatus. The NodeB according to the embodiment of the invention can be a macro NodeB, a pico NodeB, a home NodeB, etc.

Based upon the same inventive idea, there are further provided in embodiments of the invention a system for centralized determination of an uplink and downlink configuration, a network-side apparatus for centralized determination of an uplink and downlink configuration and a NodeB for centralized determination of an uplink and downlink configuration, and since these apparatuses address the problem under a similar principle to the method of centralized determination of an uplink and downlink configuration, reference can be made to the implementation of the method for implementations for these apparatuses, and a repeated description thereof will be omitted here.

Figure 3:
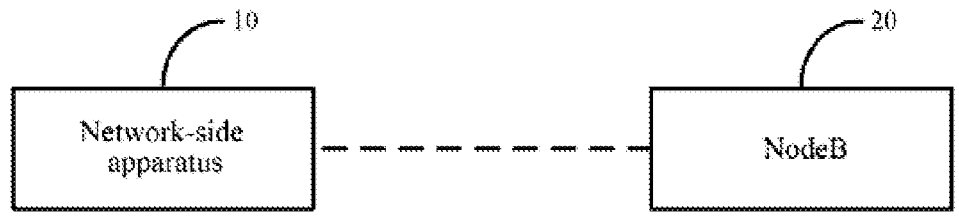
FIG. 3 is a schematic diagram of a system for centralized determination of an uplink and downlink configuration according to an embodiment of the invention.

As illustrated in FIG. 3, a system for centralized determination of an uplink and downlink configuration according to an embodiment of the invention includes a network-side apparatus 10 and NodeBs 20.

The network-side apparatus 10 is configured to determine a first RSRP value of a reference signal of a second cell received by a first cell, where the second cell is an adjacent cell to the first cell, and to determine from the first RSRP value whether the first cell can select an uplink and downlink configuration autonomously.

Particularly the network-side apparatus 10 can compare the first RSRP value with a power threshold corresponding to the first cell and determine whether the first RSRP value is below the corresponding power threshold, and if so, then the apparatus determines that the first cell can select an uplink and downlink configuration autonomously; otherwise, the apparatus determines that the first cell can not select an uplink and downlink configuration autonomously.

Here the power threshold corresponding to the cell can be prescribed in a protocol. The power threshold can also be updated as needed.

In an implementation, the first RSRP value determined by the network-side apparatus 10 is measured and reported by a NodeB 20 serving the first cell.

Specifically the NodeB 20 establishes downlink synchronization with the adjacent cell, measures a downlink signal of the adjacent cell and obtains the first RSRP value.

For example the NodeB 20 firstly searches for a cell in an operating frequency band of a current network upon power-on to identify a physical layer cell ID or IDs of one or more than one adjacent cell and establishes downlink synchronization with the identified adjacent cell or cells, and then measures a downlink signal or signals of the identified adjacent cell or cells, determines a first RSRP value or values of a reference signal or signals of the adjacent cell or cells received by the current cell and reports the determined first RSRP value or values to the network-side apparatus 10.

Preferably the network-side apparatus 10 determines a second RSRP value of a reference signal of the first cell received by the second cell; and correspondingly in the step 202, the network-side apparatus 10 determines from the first RSRP value and the second RSRP value whether the first cell can select an uplink and downlink configuration autonomously.

Specifically the network-side apparatus 10 compares the first RSRP value with the power threshold corresponding to the first cell and the second RSRP value with a power threshold corresponding to the second cell and determines whether both the RSRP values of the two cells are below the corresponding power thresholds, and if so, then the apparatus determines that the first cell can select an uplink and downlink configuration autonomously; otherwise, the apparatus determines that the first cell can not select an uplink and downlink configuration autonomously. If so, then the apparatus can further determine that the second cell can select an uplink and downlink configuration autonomously; otherwise, the apparatus can further determine that the second cell can not select an uplink and downlink configuration autonomously.

Here the power thresholds corresponding to the cells can be prescribed in a protocol. The power thresholds can also be updated as needed.

Particularly the network-side apparatus 10 determines the second RSRP value in two approaches:

In a first approach, a NodeB 20 serving the second cell reports the second RSRP value; and correspondingly the network-side apparatus 10 receives the second RSRP value measured and reported by the NodeB 20 serving the second cell.

The NodeB 20 serving the second cell determines the second RSRP value in the same way as the NodeB 20 serving the first cell determines the first RSRP value, and a repeated description thereof will be omitted here.

In a second approach, the network-side apparatus 10 receives a path loss value between the first cell and the second cell reported by a NodeB 20 and determines the second RSRP value from a transmission power value of the first cell and the path loss value between the first cell and the second cell.

Specifically the NodeB 20 serving the first cell reports the path loss value between the first cell and the second cell; and the network-side apparatus 10 makes the difference between the transmission power value of the first cell and the path loss value between the first cell and the second cell and obtains the difference as the second RSRP value upon reception of the path loss value.

In an implementation, the NodeB 20 obtains uplink and downlink sub-frame allocation information of the adjacent cell and CRS transmission power information of the adjacent cell via a network interface (for example, the macro cell or a pico cell can obtain the foregoing information via an X2 interface; and a femto cell can obtain the foregoing information via an S1 interface), and then the NodeB 20 subtracts the first RSRP from the CRS transmission power information of the corresponding adjacent cell to obtain the path loss value between the current cell and the adjacent cell.

Whether the first approach or the second approach is particularly adopted can be set in a protocol or higher-layer signaled.

The network-side apparatus 10 instructs the first cell to select an uplink and downlink configuration autonomously, and can further notify each cell adjacent to the first cell, after determining that the first cell can select an uplink and downlink configuration autonomously; and The network-side apparatus 10 notifies the first cell of uniform uplink and downlink configuration information, and can further notify each cell adjacent to the first cell, after determining that the first cell can not select an uplink and downlink configuration autonomously.

Particularly the network-side apparatus 10 according to the embodiment of the invention can be a higher-layer apparatus, e.g., an RNC apparatus, or another network-side apparatus or a new network-side apparatus.

Figure 4:
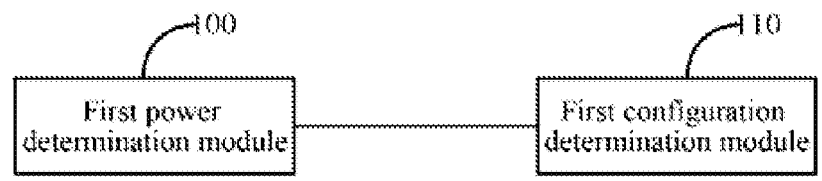
FIG. 4 is a schematic structural diagram of a network-side apparatus for centralized determination of an uplink and downlink configuration according to an embodiment of the invention.

As illustrated in FIG. 4, a network-side apparatus for centralized determination of an uplink and downlink configuration according to an embodiment of the invention includes a first power determination module 100 and a first configuration determination module 110.

The first power determination module 100 is configured to determine a first RSRP value of a reference signal of a second cell received by a first cell, where the second cell is an adjacent cell to the first cell.

The first configuration determination module 110 is configured to determine from the first RSRP value whether the first cell can select an uplink and downlink configuration autonomously.

Preferably the first power determination module 100 can further determine a second RSRP value of a reference signal of the first cell received by the second cell, so that whether the first cell can select an uplink and downlink configuration autonomously can be determined from the first RSRP value and the second RSRP value.

Particularly the first power determination module 100 receives the first RSRP value measured and reported by a NodeB.

The first power determination module 100 can receive a path loss value between the first cell and the second cell reported by a NodeB and determine the second RSRP value from a transmission power value of the first cell and the path loss value between the first cell and the second cell.

If it is determined only from the first RSRP value whether the first cell can select an uplink and downlink configuration autonomously, then the first configuration determination module 110 compares the first RSRP value with a power threshold corresponding to the first cell and determines whether the first RSRP value is below the corresponding power threshold, and if so, then the module determines that the first cell can select an uplink and downlink configuration autonomously; otherwise, the module determines that the first cell can not select an uplink and downlink configuration autonomously.

If it is determined from the first RSRP value and the second RSRP value whether the first cell can select an uplink and downlink configuration autonomously, then the first configuration determination module 110 compares the first RSRP value with a power threshold corresponding to the first cell and the second RSRP value with a power threshold corresponding to the second cell and determine whether both the RSRP values of the two cells are below the corresponding power thresholds, and if so, then the module determines that the first cell can select an uplink and downlink configuration autonomously; otherwise, the module determines that the first cell can not select an uplink and downlink configuration autonomously.

Particularly the first configuration determination module 110 instructs the first cell to select an uplink and downlink configuration autonomously, and can further notify each cell adjacent to the first cell, after determining that the first cell can select an uplink and downlink configuration autonomously; and notifies the first cell of uniform uplink and downlink configuration information, and can further notify each cell adjacent to the first cell, after determining that the first cell can not select an uplink and downlink configuration autonomously.

Figure 5:
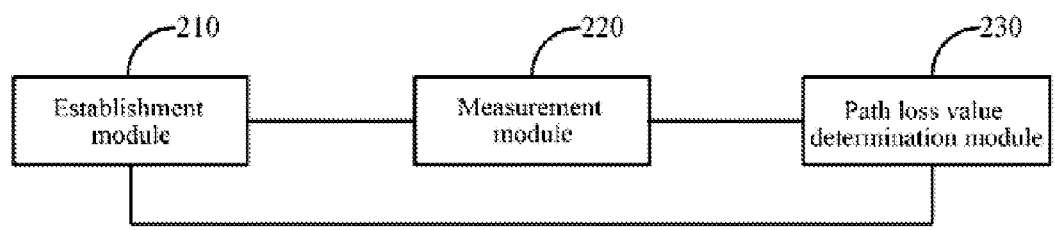
FIG. 5 is a schematic structural diagram of a NodeB for centralized determination of an uplink and downlink configuration according to an embodiment of the invention.

As illustrated in FIG. 5, a NodeB for centralized determination of an uplink and downlink configuration according to an embodiment of the invention includes an establishment module 210 and a measurement module 220. Cells covered by the NodeB includes a first cell.

The establishment module 210 is configured to establish downlink synchronization with a second cell.

The measurement module 220 is configured to measure a downlink signal of the second cell and to obtain and report a first RSRP value.

Particularly the NodeB according to the embodiment of the invention can further include a path loss value determination module 230.

The path loss value determination module 230 is configured to determine a path loss value between the first cell and the second cell from a transmission power value of the second cell and the first RSRP value.

Particularly the establishment module 210 establishes downlink synchronization with the second cell upon power-on.

The path loss value determination module 230 obtains the transmission power value of the second cell via an X2 interface or an S1 interface.

Figure 6:
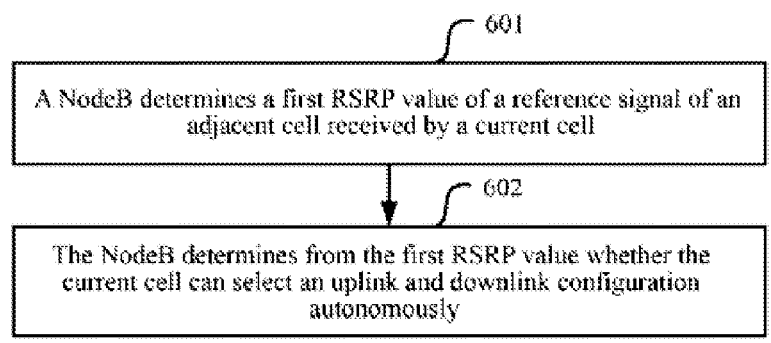
FIG. 6 is a schematic flow chart of a method of distributed determination of an uplink and downlink configuration according to an embodiment of the invention.

As illustrated in FIG. 6, a method of distributed determination of an uplink and downlink configuration according to an embodiment of the invention includes the following steps:

Step 601. A NodeB determines a first RSRP value of a reference signal of an adjacent cell received by a current cell.

Step 602. The NodeB determines from the first RSRP value whether the current cell can select an uplink and downlink configuration autonomously.

In the embodiment of the invention, distributed refers to allowable interference level values of current cells (and possibly also adjacent cells) being preset in respective NodeBs and then making determination separately by the respective NodeBs.

Particularly the NodeB compares the first RSRP value with a power threshold corresponding to the current cell and determines whether the first RSRP value is below the corresponding power threshold, and if so, then the NodeB determines that the current cell can select an uplink and downlink configuration autonomously; otherwise, the NodeB determines that the current cell can not select an uplink and downlink configuration autonomously.

As illustrated in FIG. 1B, for example, the macro NodeB detects an RSRP strength of a reference signal of a femto cell received by the macro cell as X dBm. The macro NodeB presets an allowable interference level value of the macro cell as M dBm (this threshold is derived from simulation and evaluation or network measurement), and if X<M, then the NodeB determines that the macro cell can select an uplink and downlink configuration autonomously.

The power threshold corresponding to the cell can be prescribed in a protocol. The power threshold can also be updated as needed.

In the step 601, the NodeB establishes downlink synchronization with the adjacent cell, measures a downlink signal of the adjacent cell and obtains the first RSRP value.

Specifically the NodeB firstly searches for a cell in an operating frequency band of a current network upon power-on to identify a physical layer ID or IDs of one or more than one adjacent cell and establishes downlink synchronization with the identified adjacent cell or cells, and then measures a downlink signal or signals of the identified adjacent cell or cells, determines a first RSRP value or values of a reference signal or signals of the adjacent cell or cells received by the current cell and reports the determined first RSRP value or values to the network-side apparatus. If there are a plurality of adjacent cells, then there will be a first RSRP value for each adjacent cell. The identifiers of the cells can be bound with the corresponding first RSRP values for report; or the first RSRP values can be reported in a preset order; or the first RSRP values can be reported in another prescribed manner as long as the network-side apparatus can ascertain a specific adjacent cell to which each RSRP value corresponds.

Preferably before the step 602, the method further includes:

The NodeB determines a second RSRP value of a reference signal of the current cell received by the adjacent cell; and correspondingly in the step 602, the NodeB determines from the first RSRP value and the second RSRP value whether the current cell can select an uplink and downlink configuration autonomously.

Specifically the NodeB compares the first RSRP value with the power threshold corresponding to the current cell and the second RSRP value with a power threshold corresponding to the adjacent cell and determines whether both the RSRP values of the two cells are below the corresponding power thresholds, and if so, then the NodeB determines that the current cell can select an uplink and downlink configuration autonomously; otherwise, the NodeB determines that the current cell can not select an uplink and downlink configuration autonomously.

As illustrated in FIG. 1B, the macro NodeB detects an RSRP strength of a femto cell received by the macro cell as X dBm and an RSRP strength of the macro cell received by the femto cell determined by the macro NodeB as Y dBm. The macro NodeB presets an allowable interference level value of the macro cell as M dBm and an allowable interference level value of the femto cell as N dBm. The NodeB makes centralized determination that an uplink and downlink configuration can be selected autonomously when X<M and Y<N.

Here the thresholds corresponding to the cells can be prescribed in a protocol. The thresholds can also be updated as needed.

Particularly the NodeB determines the second RSRP value in two approaches:

In a first approach, the NodeB obtains the second RSRP value via an X2 interface or an S1 interface.

For example, the NodeB can obtain the second RSRP value from the NodeB serving the adjacent cell via an X2 interface or an S1 interface; or can obtain the second RSRP value from a centralized network-side apparatus according to an embodiment of the invention via an X2 interface or an S1 interface.

In a second approach, the NodeB determines a path loss value between the current cell and the adjacent cell from a transmission power value of the adjacent cell and the first RSRP value and determines the second RSRP value from a transmission power value of the current cell and the determined path loss value between the current cell and the adjacent cell.

In an implementation, the NodeB obtains uplink and downlink sub-frame allocation information of the adjacent cell and CRS transmission power information of the adjacent cell via a network interface (for example, the macro cell or a pico cell can obtain the foregoing information via an X2 interface; and a femto cell can obtain the foregoing information via an S1 interface), and then the NodeB subtracts the first RSRP from the CRS transmission power information of the corresponding adjacent cell and obtains the path loss value between the current cell and the adjacent cell.

Whether the first approach or the second approach is particularly adopted can be set in a protocol or higher-layer signaled.

After the step 602, the method further includes:

The NodeB selects an uplink and downlink configuration autonomously after determining that the current cell can select an uplink and downlink configuration autonomously; and The NodeB selects an uplink and downlink configuration according to configuration information after determining that the current cell can not select an uplink and downlink configuration autonomously.

The NodeB selects an uplink and downlink configuration according to configuration information in one of the following approaches but will not be limited thereto:

The NodeB selects an uplink and downlink configuration according to default configuration information; the NodeB selects an uplink and downlink configuration according to uniform configuration information transmitted from the network side; or the NodeB selects an uplink and downlink configuration according to configuration information of the interfering adjacent cell (that is, selects the same uplink and downlink configuration as the interfering adjacent cell).

The NodeB sets an uplink and downlink configuration according to a determination result and sets up the current cell to start provision of a communication service to a UE.

Particularly the NodeB according to the embodiment of the invention can be a macro NodeB, a pico NodeB, a home NodeB, etc.

Based upon the same inventive idea, there is further provided in embodiments of the invention a NodeB for distributed determination of an uplink and downlink configuration, and since the NodeB addresses the problem under a similar principle to the method of distributed determination of an uplink and downlink configuration, reference can be made to the implementation of the method for an implementation for the NodeB, and a repeated description thereof will be omitted here.

Figure 7:
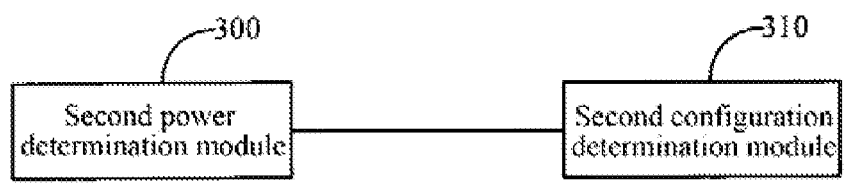
FIG. 7 is a schematic structural diagram of a NodeB for distributed determination of an uplink and downlink configuration according to an embodiment of the invention.

As illustrated in FIG. 7, a NodeB for distributed determination of an uplink and downlink configuration according to an embodiment of the invention includes a second power determination module 300 and a second configuration determination module 310.

The second power determination module 300 is configured to determine a first RSRP value of a reference signal of an adjacent cell received by a current cell.

The second configuration determination module 310 is configured to determine from the first RSRP value whether the current cell can select an uplink and downlink configuration autonomously.

Particularly the second power determination module 300 establishes downlink synchronization with the adjacent cell, measures a downlink signal of the adjacent cell and obtains the first RSRP value.

Specifically the second configuration determination module 310 establishes downlink synchronization with the adjacent cell upon power-on.

In an implementation, the second power determination module 300 determines a second RSRP value of a reference signal of the current cell received by the adjacent cell; and correspondingly the second configuration determination module 310 determines from the first RSRP value and the second RSRP value whether the current cell can select an uplink and downlink configuration autonomously.

Preferably the second power determination module 300 determines a path loss value between the current cell and the adjacent cell from a transmission power value of the adjacent cell and the first RSRP value and determines the second RSRP value from a transmission power value of the current cell and the determined path loss value between the current cell and the adjacent cell; or obtains the second RSRP value via an X2 interface or an S1 interface.

Particularly the second power determination module 310 obtains the transmission power value of the adjacent cell via an X2 interface or an S1 interface.

If it is determined only from the first RSRP value whether the current cell can select an uplink and downlink configuration autonomously, then the second configuration determination module 310 compares the first RSRP value with a power threshold corresponding to the current cell and determine whether the first RSRP value is below the corresponding power threshold, and if so, then the module determines that the current cell can select an uplink and downlink configuration autonomously; otherwise, the module determines that the current cell can not select an uplink and downlink configuration autonomously.

If it is determined from the first RSRP value and the second RSRP value whether the current cell can select an uplink and downlink configuration autonomously, then the second configuration determination module 310 compares the first RSRP value with a power threshold corresponding to the current cell and the second RSRP value with a power threshold corresponding to the adjacent cell and determines whether both the RSRP values of the two cells are below the corresponding power thresholds, and if so, then the module determines that the current cell can select an uplink and downlink configuration autonomously; otherwise, the module determines that the current cell can not select an uplink and downlink configuration autonomously.

Particularly the second configuration determination module 310 selects an uplink and downlink configuration autonomously after determining that the current cell can select an uplink and downlink configuration autonomously; and selects an uplink and downlink configuration according to configuration information after determining that the current cell can not select an uplink and downlink configuration autonomously.

The second configuration determination module 310 selects an uplink and downlink configuration according to configuration information in one of the following approaches but will not be limited thereto:

The module selects an uplink and downlink configuration according to default configuration information; selects an uplink and downlink configuration according to uniform configuration information transmitted from the network side; or selects an uplink and downlink configuration according to configuration information of the interfering adjacent cell (that is, selects the same uplink and downlink configuration as the interfering adjacent cell).

Both centralized and distributed can be arranged in the same network so that either centralized or distributed can be selected for use as needed; or both centralized and distributed can be used concurrently. In other words, a NodeB configured in the network can be arranged to function as a centralized NodeB or as a distributed NodeB or as both a centralized NodeB and a distributed NodeB; and no matter whatever arrangement, an entity apparatus or a virtual apparatus or a logic node functioning as a centralized network-side apparatus can be configured in the network.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Since it is determined from detection of an RSRP value whether a cell can select an uplink and downlink configuration independently, a dynamic uplink and downlink configuration can be enforced normally, and interference between adjacent cells can be alleviated in a dynamic uplink and downlink configuration context to thereby improve the efficiency of a system.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method of determining an uplink-downlink configuration, comprising:
   determining, by a network-side apparatus, a first Reference Signal Received Power, RSRP, value of a reference signal of a second cell received by a first cell, wherein the second cell is an adjacent cell to the first cell and the first RSRP value is measured and reported by a NodeB serving the first cell to the network-side apparatus; and
   comparing, by the network-side apparatus, the first RSRP value with a power threshold corresponding to the first cell, and determining from the comparison result whether or not the first cell autonomously selects uplink-downlink configuration, the uplink-downlink configuration being allocation of subframes in each radio frame for uplink transmission and for downlink transmission, wherein the determining, by the network-side apparatus, whether or not the first cell autonomously selects the uplink-downlink configuration comprises:
      comparing, by the network-side apparatus, the first RSRP value with the power threshold corresponding to the first cell and determining whether the first RSRP value is below the power threshold, and if so, then determining that the first cell selects the uplink-downlink configuration autonomously; otherwise, determining that the first cell does not select the uplink-downlink configuration autonomously.

2. The method according to claim 1, wherein before the network-side apparatus determines whether or not the first cell selects the uplink-downlink configuration autonomously, the method further comprises:
   determining, by the network-side apparatus, a second RSRP value of a reference signal of the first cell received by the second cell; and
   determining, by the network-side apparatus, whether or not the first cell autonomously selects the uplink-downlink configuration comprises:
   determining, by the network-side apparatus, from the first RSRP value and the second RSRP value whether or not the first cell autonomously selects the uplink-downlink configuration.

3. The method according to claim 2, wherein before the network-side apparatus determines the second RSRP value, the method further comprises:
   receiving, by the network-side apparatus, a path loss value between the first cell and the second cell reported by the NodeB serving the first cell; and the determining, by the network-side apparatus, the second RSRP value comprises:
   determining, by the network-side apparatus, the second RSRP value from a transmission power value of the first cell and the path loss value between the first cell and the second cell.

4. The method according to claim 2, wherein determining, by the network-side apparatus, whether or not the first cell selects the uplink-downlink configuration autonomously comprises:
   comparing, by the network-side apparatus, the first RSRP value with the power threshold corresponding to the first cell and the second RSRP value with a power threshold corresponding to the second cell and determining whether both the RSRP values of the two cells are below the corresponding power thresholds, and if so, then determining that the first cell selects the uplink-downlink configuration autonomously; otherwise, determining that the first cell does not select the uplink-downlink configuration autonomously.

5. The method according to claim 1, wherein before the network-side apparatus determines the first RSRP value, the method further comprises:
   establishing, by the NodeB serving the first cell, downlink synchronization with the second cell, and measuring a downlink signal of the second cell to obtain the first RSRP value;
   reporting, by the NodeB, the first RSRP value to the network-side apparatus; and
   receiving, by the network-side apparatus, the first RSRP value.

6. The method according to claim 5, wherein the NodeB establishes downlink synchronization with the second cell upon power-on.

7. The method according to claim 1, wherein after the network-side apparatus determines whether or not the first cell selects the uplink-downlink configuration autonomously, the method further comprises:
   instructing, by the network-side apparatus, the first cell to select the uplink-downlink configuration autonomously after determining that the first cell selects the uplink-downlink configuration autonomously; and
   notifying, by the network-side apparatus, the first cell of the uplink-downlink configuration after determining that the first cell does not select the uplink-downlink configuration autonomously.

8. A network-side apparatus for determining an uplink-downlink configuration, comprising:
   a processor; and
   a memory to store instructions, which when executed from the memory, cause the processor to:
   determine a first RSRP value of a reference signal of a second cell received by a first cell, wherein the second cell is an adjacent cell to the first cell and the first RSRP value is measured and reported by a NodeB serving the first cell to the first power determination module; and
   compare the first RSRP value with a power threshold corresponding to the first cell, and determine from the comparison result whether or not the first cell autonomously selects the uplink-downlink configuration, the uplink-downlink configuration being allocation of subframes in each radio frame for uplink transmission and for downlink transmission, wherein to determine, by the network-side apparatus, whether or not the first cell autonomously selects the uplink-downlink configuration comprises:
   compare the first RSRP value with the power threshold corresponding to the first cell and to determine whether the first RSRP value is below the power threshold, and if so, then to determine that the first cell selects the uplink-downlink configuration autonomously; otherwise, to determine that the first cell does not select the uplink-downlink configuration autonomously.

9. The network-side apparatus according to claim 8, wherein the processor is further configured to determine a second RSRP value of a reference signal of the first cell received by the second cell; and
   to determine from the first RSRP value and the second RSRP value whether or not the first cell selects the uplink-downlink configuration autonomously.

10. The network-side apparatus according to claim 8, wherein the processor is further configured:
   to instruct the first cell to select the uplink-downlink configuration autonomously after determining that the first cell selects the uplink-downlink configuration autonomously; and
   to notify the first cell of the uplink-downlink configuration after determining that the first cell does not select the uplink-downlink configuration autonomously.

11. A method of determining an uplink-downlink configuration, comprising:
   determining, by a NodeB, a first RSRP value of a reference signal of an adjacent cell received by a current cell, the NodeB resides in the current cell; and
   comparing, by the NodeB, the first RSRP value with a power threshold corresponding to the current cell, and determining from the comparison result whether or not the current cell autonomously selects the uplink-downlink configuration; the uplink-downlink configuration being allocation of subframes in each radio frame for uplink transmission and for downlink transmission, wherein determining, by the NodeB, whether or not the current cell selects the uplink-downlink configuration autonomously comprises:
   comparing, by the NodeB, the first RSRP value with the power threshold corresponding to the current cell and determining whether the first RSRP value is below the power threshold, and if so, then determining that the current cell selects the uplink-downlink configuration autonomously; otherwise, determining that the current cell does not select the uplink-downlink configuration autonomously.

12. The method according to claim 11, wherein determining, by the NodeB, the first RSRP value comprises:
   establishing, by the NodeB, downlink synchronization with the adjacent cell, and measuring a downlink signal of the adjacent cell to obtain the first RSRP value.

13. The method according to claim 12, wherein the NodeB establishes downlink synchronization with the adjacent cell upon power-on.

14. The method according to claim 11, wherein before the NodeB determines whether or not the current cell selects the uplink-downlink configuration autonomously, the method further comprises:
   determining, by the NodeB, a second RSRP value of a reference signal of the current cell received by the adjacent cell; and
   determining, by the NodeB, whether or not the current cell selects the uplink-downlink configuration autonomously comprises:
   determining, by the NodeB, from the first RSRP value and the second RSRP value whether the current cell or not selects the uplink-downlink configuration autonomously.

15. The method according to claim 14, wherein determining, by the NodeB, the second RSRP value comprises:
   determining, by the NodeB, a path loss value between the current cell and the adjacent cell from a transmission power value of the adjacent cell and the first RSRP value; and
   determining, by the NodeB, the second RSRP value from a transmission power value of the current cell and the determined path loss value between the current cell and the adjacent cell.

16. The method according to claim 14, wherein determining, by the NodeB, whether or not the current cell selects the uplink-downlink configuration autonomously comprises:
   comparing, by the NodeB, the first RSRP value with the power threshold corresponding to the current cell and the second RSRP value with a power threshold corresponding to the adjacent cell and determining whether both the RSRP values of the two cells are below the corresponding power thresholds, and if so, then determining that the current cell selects the uplink-downlink configuration autonomously; otherwise, determining that the current cell does not select the uplink-downlink configuration autonomously.

17. The method according to claim 11, wherein after the NodeB determines whether or not the current cell selects the uplink-downlink configuration autonomously, the method further comprises:
   selecting, by the NodeB, the uplink-downlink configuration autonomously after determining that the current cell selects the uplink-downlink configuration autonomously; and
   selecting, by the NodeB, the uplink-downlink configuration according to configuration information after determining that the current cell does not select the uplink-downlink configuration autonomously.

18. The method according to claim 11, wherein selecting, by the NodeB, the uplink-downlink configuration according to configuration information comprises:
   selecting, by the NodeB, the uplink-downlink configuration according to default configuration information; or selecting the uplink-downlink configuration according to configuration information transmitted from a network side; or selecting the uplink-downlink configuration according to configuration information of the interfering adjacent cell.

* * * * *